UNITED STATES PATENT OFFICE.

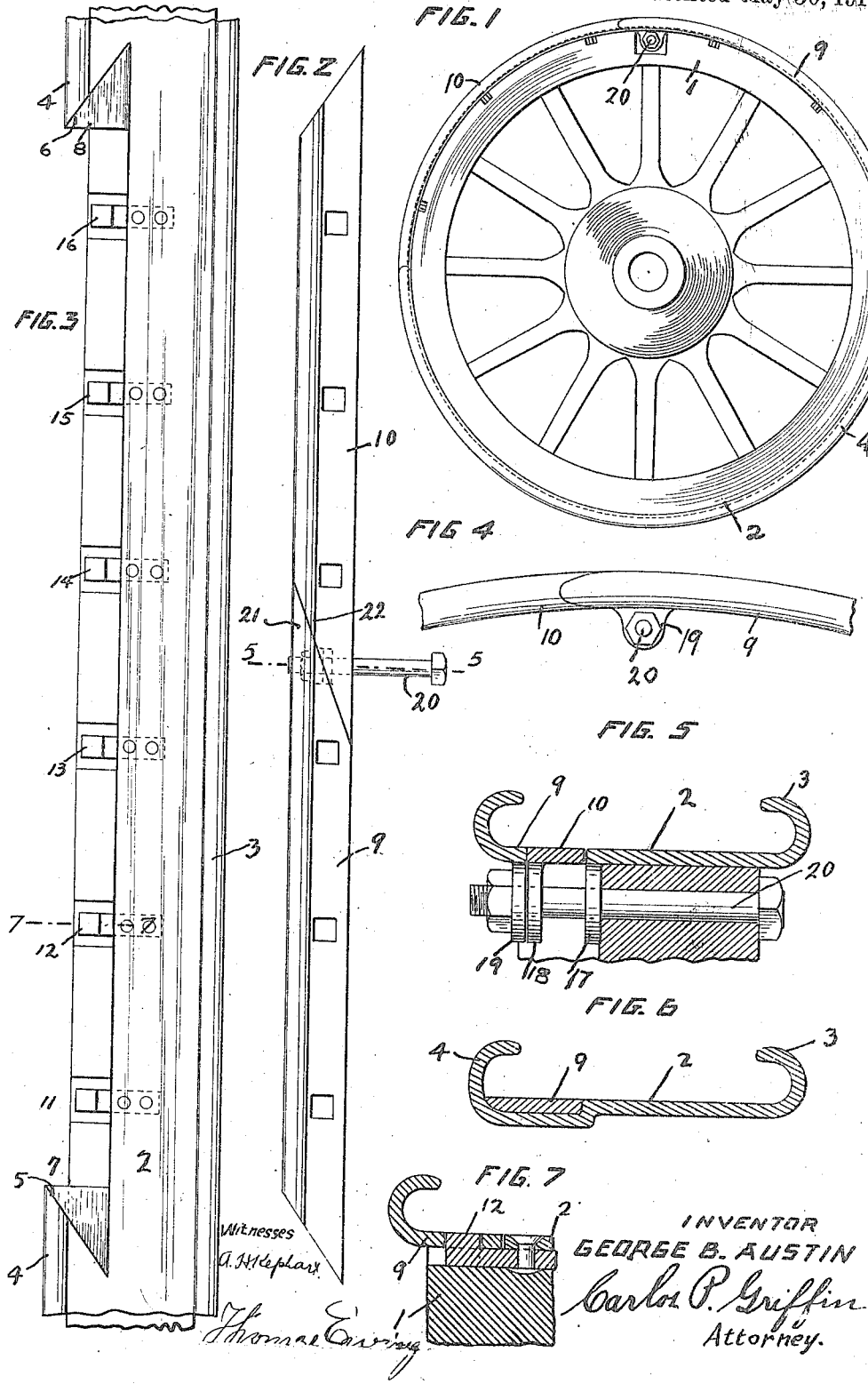

GEORGE B. AUSTIN, OF JUNGO, NEVADA.

WHEEL-RIM.

1,185,044.

Specification of Letters Patent. Patented May 30, 1916.

Application filed April 26, 1915. Serial No. 23,832.

*To all whom it may concern:*

Be it known that I, GEORGE B. AUSTIN, a citizen of the United States, residing at Jungo, in the county of Humboldt, State of Nevada, have invented a new and useful Wheel-Rim, of which the following is a specification in such full and clear terms as will enable those skilled in the art to construct and use the same.

This invention relates to a clencher tire wheel rim, the object of which is to provide a clencher rim with means whereby the tire may be removed therefrom without lifting the bead off the tire over the top of the rim flange.

It will be understood by those skilled in the art that the difficulty of putting on and removing clencher tires is very considerable, and in addition the tire bead is often broken or injured by the undue stretching it gets in the process.

This invention provides the clencher rim with a removable flange for one half of one side, thereby making it possible to place the tire on the rim with the least possible labor and without stretching the bead.

An embodiment of the invention is shown in the drawing, in which the same reference numeral is applied to the same portion throughout, but I am aware that there may be many modifications thereof.

Figure 1 is a side elevation of a wheel with this rim applied thereto, Fig. 2 is a plan view of the removable part of the rim showing the bolt for connecting said parts with the wheel and rim, Fig. 3 is a development on a larger scale of one half of the rim, Fig. 4 is a side elevation of the removable parts of the rim where they are joined, Fig. 5 is a cross sectional view of the rim adjacent the bolt for securing the removable parts thereto, Fig. 6 is a cross section of the rim at the end of one of the removable parts showing the reinforcement therein in which the removable part of the rim is seated, and Fig. 7 is a cross section of the rim on the line 7—7 Fig. 3.

The numeral 1 represents a wheel which may be of any suitable type. The wheel is provided with a rim 2, said rim having one complete flange 3 and a flange 4 extending only one half way around it. The short flange has its ends cut on reverse bevels as at 5 and 6 and it has reinforcing parts 7 and 8 at said ends pressed down to form pockets for the ends of the detachable quarter flanges 9 and 10.

The main rim, which also forms the felly band for holding the wheel together, is provided with six hooks or lugs 11 to 16 inclusive, three for each quarter flange. The hooks project through holes in the quarter flanges and when they are in place thereon prevent the detachable quarter flanges from moving sidewise under the pressure of the tire beads.

At the center of the open side of the rim there is a lug 17 and the quarter rims have lugs 18 and 19 respectively which register with the lug 17, a bolt 20 being passed through the wheel felly band and said lugs to secure the two detachable flanges in place on the wheel. The ends of the detachable flanges are reversely tapered to fit the main body of the rim and their ends 21 and 22 are tapered to fit each other, one being put on before the other.

An advantage of the construction just disclosed lies in the fact that there is only one bolt to remove when a tire change is to be made.

In use the nut on the bolt 20 is removed, the bolt is driven back until it is free of the lugs 18 and 19, whereupon the detachable flanges may be taken off the rim with the fingers, the tire bead being easily pushed back enough to lift the flanges over the tops of the lugs 11 to 16. When the quarter flanges have been removed there is nothing to prevent the complete removal of the tire without stretching its bead. The tire is replaced in the reverse order.

Having thus described my invention what I claim as new and desire to secure by Letters Patent of the United States, is as follows, modifications within the scope of the claims being expressly reserved:

1. A wheel rim comprising a felly band having an integral flange on one side and on substantially one half the other side, lugs carried by the felly band, a pair of tapered end flanges to complete the half flange of the rim, each of said flanges having openings to coöperate with the lugs and being substantially one quarter the length of the complete flange, and a bolt to secure both of said tapered end flanges to the wheel.

2. A wheel rim comprising a felly band having an integral flange on one side and on substantially one half the other side, said rim also having pockets adjacent the ends of the half flange, a pair of tapered end flanges each having a lug at one end and the other ends thereof being adapted to be seated in said pockets of the rim, and a bolt adapted to pass through both of said lugs to secure the tapered end flanges to the wheel rim.

3. A wheel rim comprising a felly band having an integral flange on one side and on substantially one half the other side, said rim also having pockets adjacent the ends of the half flange, a plurality of locking lugs secured to said rim, a pair of tapered end flanges each having a lug at one end and the other end thereof being adapted to be seated in the pockets adjacent the ends of the half flange, said flanges also having openings to coöperate with the locking lugs, and a bolt adapted to pass through both of the lugs on said tapered end flanges for securing them to the wheel rim.

In testimony whereof I have hereunto set my hand this 17th day of April A. D. 1915, in the presence of the two subscribed witnesses.

GEORGE B. AUSTIN.

Witnesses:
C. P. GRIFFIN,
L. H. ANDERSON.